United States Patent
Brackett et al.

(10) Patent No.: US 8,682,284 B2
(45) Date of Patent: Mar. 25, 2014

(54) LOCALIZED PERSONAL EMERGENCY RESPONSE SYSTEM

(75) Inventors: Cameron Brackett, Pewaukee, WI (US); Gregory A. Lillegard, Menonomee Falls, WI (US)

(73) Assignee: Honeywell International Inc., Morristown, NJ (US)

( * ) Notice: Subject to any disclaimer, the term of this patent is extended or adjusted under 35 U.S.C. 154(b) by 733 days.

(21) Appl. No.: 12/357,199

(22) Filed: Jan. 21, 2009

(65) Prior Publication Data

US 2010/0184400 A1    Jul. 22, 2010

(51) Int. Cl.
*H04M 11/04* (2006.01)

(52) U.S. Cl.
USPC ................... 455/404.2; 340/573.1; 340/517; 379/45

(58) Field of Classification Search
USPC ......... 455/404.1–402, 556.1, 414.2; 340/531, 340/573.1, 517; 379/45; 714/712
See application file for complete search history.

(56) References Cited

U.S. PATENT DOCUMENTS

| | | | |
|---|---|---|---|
| 6,678,514 B2 * | 1/2004 | Wheeler et al. | 455/404.2 |
| 2002/0169584 A1 * | 11/2002 | Fu et al. | 702/188 |
| 2004/0198386 A1 * | 10/2004 | Dupray | 455/456.1 |
| 2004/0203768 A1 * | 10/2004 | Ylitalo et al. | 455/435.1 |
| 2005/0143048 A1 * | 6/2005 | Binning | 455/404.2 |
| 2005/0153681 A1 * | 7/2005 | Hanson | 455/404.2 |
| 2007/0087726 A1 * | 4/2007 | McGary et al. | 455/404.1 |
| 2007/0218869 A1 * | 9/2007 | Thijs et al. | 455/404.2 |
| 2009/0136006 A1 * | 5/2009 | Milton et al. | 379/45 |
| 2009/0256701 A1 * | 10/2009 | Chamberlain et al. | 340/539.12 |

FOREIGN PATENT DOCUMENTS

WO    WO 2008107841 A1 *  9/2008

* cited by examiner

*Primary Examiner* — Mahendra Patel
(74) *Attorney, Agent, or Firm* — Husch Blackwell LLP

(57) ABSTRACT

A personal emergency response system oriented to mobile individuals uses cell phones or other wireless devices as sources of an emergency indicating signal. A personal profile associated with that signal can be evaluated, along with location information to determine which emergency device(s) should be activated and which local messages should be produced to alert other individuals in the area as to the existence of an emergency.

17 Claims, 3 Drawing Sheets

LOCALIZED PERSONAL EMERGENCY RESPONSE SYSTEM

FIELD

The invention pertains to personal emergency response systems. More particularly, the invention pertains to such systems useful for mobile individuals.

BACKGROUND

Various commercially available Personal Emergency Response Systems (PERS) typically target the elderly that are commonly restricted to a small set of physical locations. For highly mobile individuals, the problem space changes and can be substantially larger.

There is a need to address this broader more mobile population. It would be preferable if emergency assistance could be summoned by someone who is traveling and in need of help without having to rely on a special transmitter.

DETAILED DESCRIPTION

Figure 1:
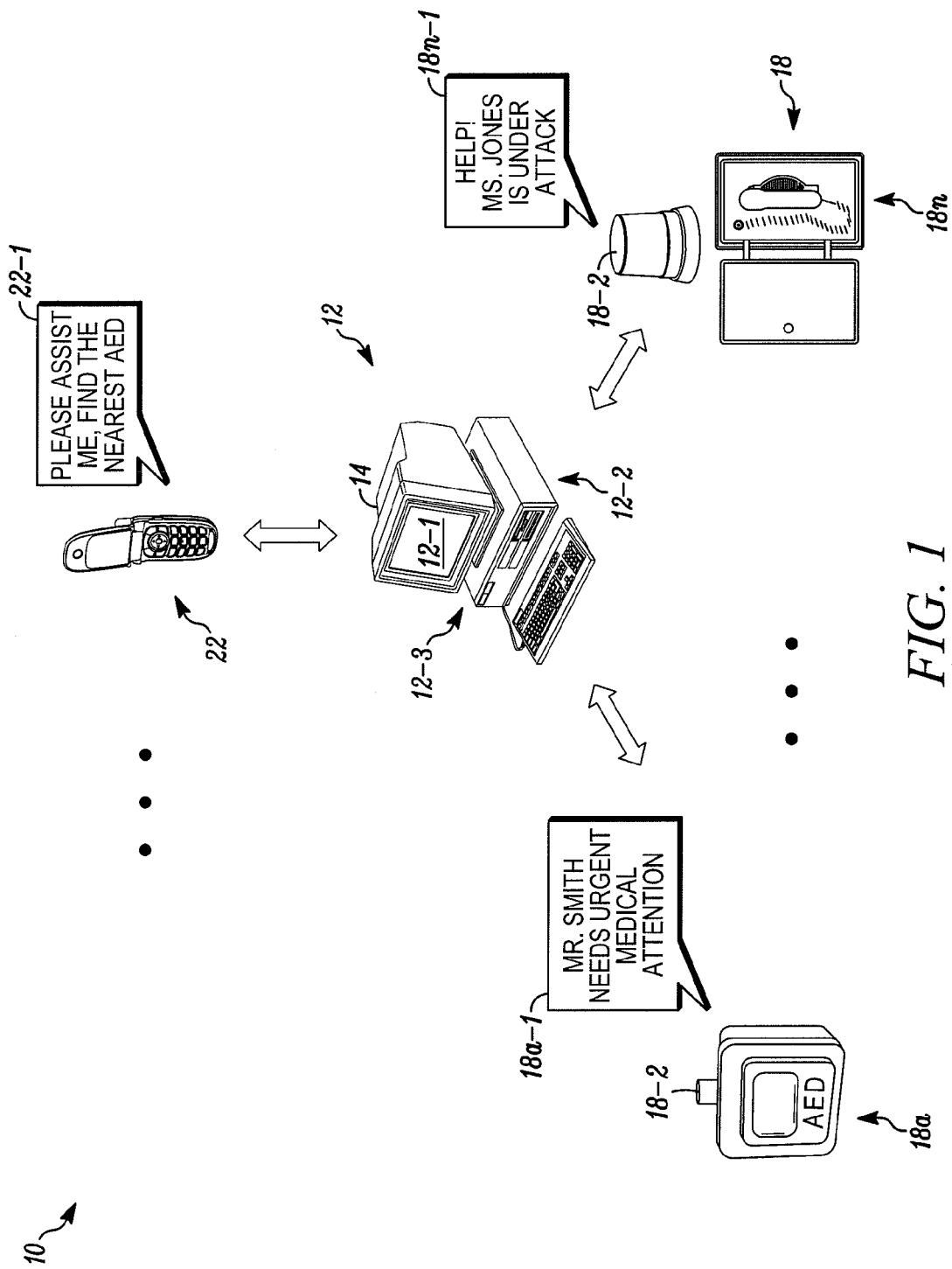
FIG. 1 is a block diagram of a system which embodies the invention.

While embodiments of this invention can take many different forms, specific embodiments thereof are shown in the drawings and will be described herein in detail with the understanding that the present disclosure is to be considered as an exemplification of the principles of the invention, as well as the best mode of practicing same, and is not intended to limit the invention to the specific embodiment illustrated.

In one aspect of the invention, cell phone technology, or other types of personal wireless devices can be used. Public life safety equipment, such as audio-visual emergency indicating devices, automatic emergency defibrillating devices (AEDs) or the like, can be included in a location system such that persons who subscribe to this location system will have communication capabilities to local emergency indicating or response devices such as AEDs.

Using a cell phone, for example, a user or subscriber could activate a PERS for possible emergency use. Upon activation, the phone searches for systems nearby that fit the appropriate PERS profile for that user. A PERS profile specific for each user, or subscriber, could be stored in the cell phone and/or the system. When one or more emergency indicating or response devices are located which are close to the user or subscriber, they can be activated to alert other individuals in the area as to the existence of the emergency.

In one aspect of the invention, a person with known cardiac arrhythmia issues would have a PERS profile that produces searches for AEDs in the vicinity. When an emergency button is pushed, for example on the user's or subscriber's phone or other personal wireless device, the AED(s) closest to that person provides audio and visual locating indicators to aid and alert other people in the vicinity of a need to respond. As the user walks around, the closest AED, registered in the system, can be activated by the press of a button on the cell phone. In addition, the subscriber's phone emits similar audio and visual aides to alert surrounding individuals, as well as remote response personnel, of the existence of an emergency condition perhaps requiring use of the local AED.

In another aspect of the invention, all public safety devices can be outfitted with a wireless communications interface such that if any cell phone or PERS in the vicinity goes into an emergency state, sending out the respective signal, the respective public safety device(s) picks up the signal and flashes a light and sounds an alarm.

For example, a student walking on campus may have a security profile, that when activated, locates emergency phones nearest that person. When the emergency button is pushed, on the subscriber's wireless unit, the emergency phone nearest the student generates audio and visual indicators to alert surrounding people, as well as remote response people, for example campus police, of a need to respond.

FIG. 1 illustrates a system 10 in accordance with the invention. System 10 can include a response coordinating unit 12. Unit 12 can include a graphical display device 12-1 and associated control software, a programmable processor 12-2 and a storage unit, a disk drive for example, 12-3. Disk drive 12-3 can be used to store a database of personal profiles of subscribers to system 10. Unit 12 could also include a wireless interface, indicated generally at 14, and have access to a locating system such as a mobile, or wireless positioning system, global positioning system or the like all without limitation.

Unit 12 can be in wired or wireless communication with members of a plurality of emergency indicating output devices, generally indicated at 18. Devices 18 could include, for example, one or more AED units such as 18a, or one or more emergency telephone and visual display units 18n, or both. The members of the plurality 18 can communicate with unit 12.

System 10 can be activated by a subscriber keying one or more keys or user inputs of a wireless device 22. When activated, the device 22 can forward the subscriber's profile to unit 12. Unit 12 can in turn establish the location of the wireless device 22 and, based on the subscriber's profile, activate one or more appropriate members of the plurality 18 which are local to the subscriber and device 22. The unit 14 can also maintain a database of user profiles for redundancy and comparison purposes.

Figure 2A:
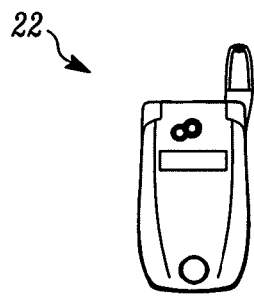
FIGS. 2A-C are diagrams which illustrate characteristics of the components of the system of FIG. 1.
Figure 2A:
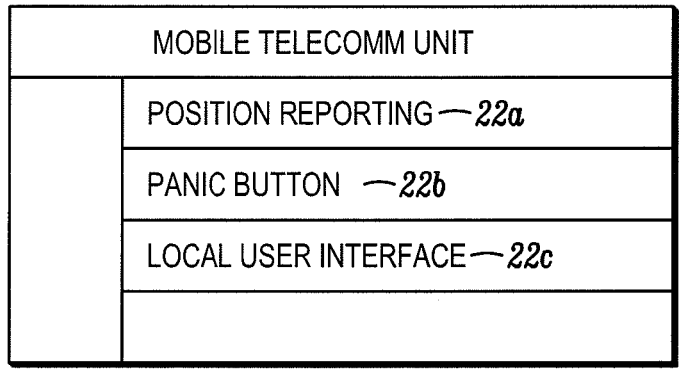
Figure 2B:
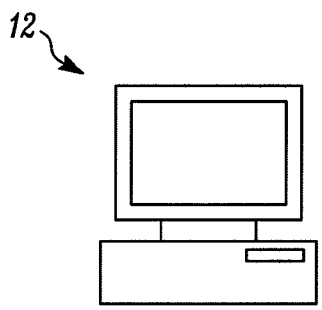
Figure 2B:
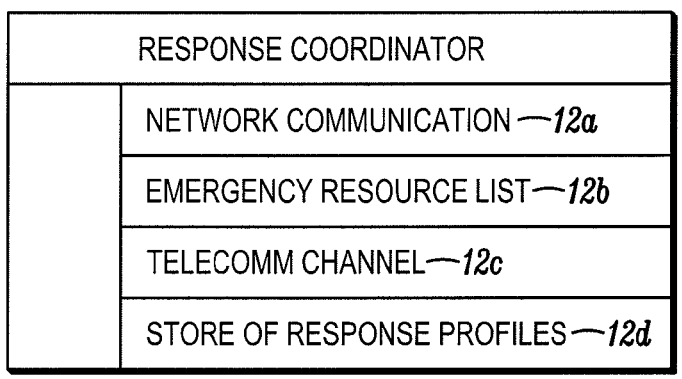
Figure 2C:
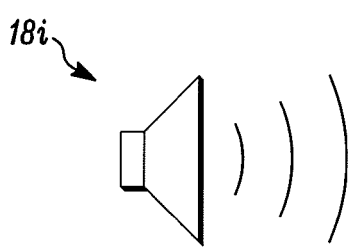
Figure 2C:
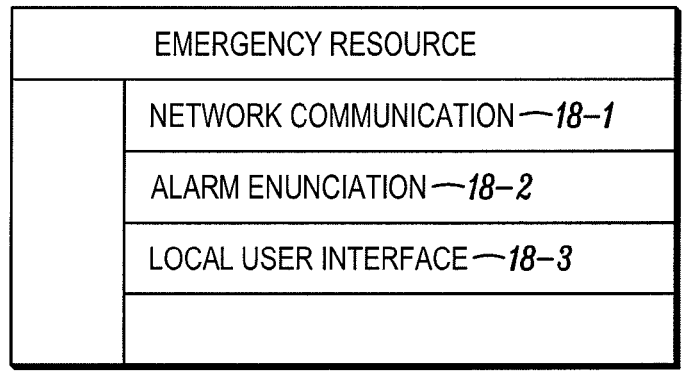

FIGS. 2A-C illustrate various characteristics of wireless unit 22, response coordinator 12 and emergency output devices 18. Wireless device 22 can include position reporting circuitry 22a, a user emergency input key or button 22b and a local user interface 22c. Response coordinator 12 can include network communication interface 12a, a pre-stored list of emergency resources 12b, such as local police, ambulance service, firefighters and the like. Wired or wireless telecommunications interfaces 12c and a database of stored subscriber profiles 12d.

It will be understood that the wireless unit 22 can be just one member of a plurality of wireless units associated with subscribers of the system 10 as well as units associated with individuals who are not subscribers of the system 10. Thus response coordinator 12 is capable of discerning which wireless units it has received communications from are entitled to service from system 10, and if so, what service is to be provided. For example, is one or more AEDs such as 18a, to be activated, or is one or more local emergency phone units such as 18n to be energized?

With respect to FIG. 2C, the emergency response units, such as 18i can include a network communication interface 18-1 for communicating with Response Coordinator 12, alarm enunciation circuitry such as a horn, siren or light, 18-2 as well as a local user interface, 18-3 to emit local informative messages such as 18a-1, or 18n-1.

Figure 3:
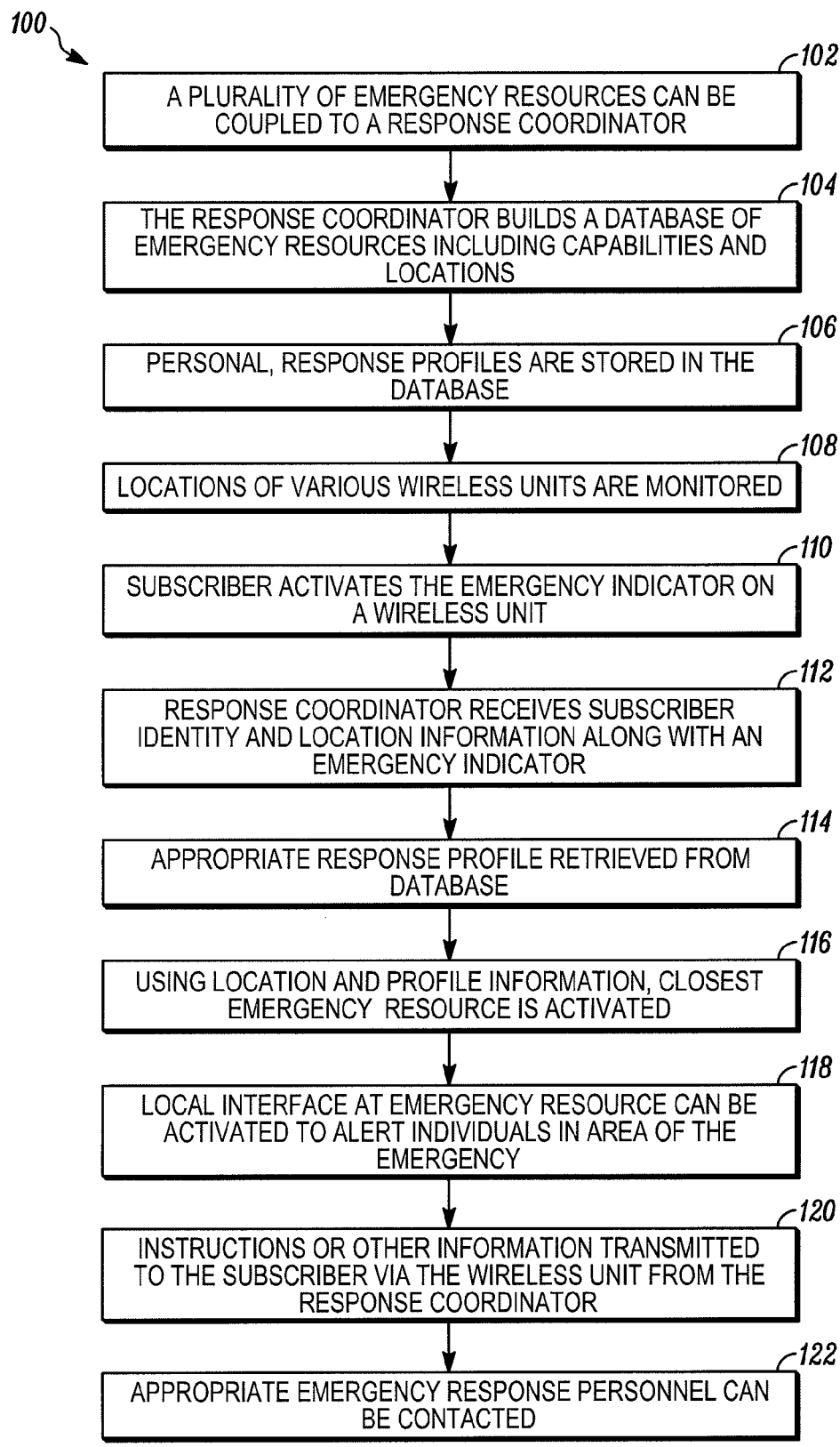
FIG. 3 illustrates a method which embodies the invention.

FIG. 3 is a diagram of a method 100 in accordance with the invention. A plurality of emergency resources can be coupled to a Response Coordinator, such as coordinator 12, as at 102. The Response Coordinator 12 builds a database of emergency resources including capabilities and locations, as at 104. Personal response profiles for each mobile telecommunications, wireless unit, such as unit 22, and the associated subscriber are registered at the Response Coordinator 12 and stored in an associated database, as at 106. The stored profile can include an optimal desired response for each subscriber or registered user of a wireless unit, such as unit 22.

Locations of various wireless units can be continuously monitored as at 108. In the event of an emergency, a Subscriber activates the emergency signal generating key or input, as at 110. The Response Coordinator receives an emergency indicator along with subscriber identity and location information from the respective wireless unit, as at 112. The appropriate response profile is retrieved from the database, as at 114. Using location and profile information, the closest emergency resource(s) is activated, as at 116. The local interface of the respective, activated, resource(s) can be energized to verbally emit instructions, such as 18a-1 and 18n-1 to other individuals in the immediate vicinity, as at 118.

Instructions or other messages to be verbalized, such as at 22-1, can be transmitted to the wireless unit 22 for use by the Subscriber or to be emitted in the Subscriber's immediate vicinity, as at 120. Appropriate emergency response personnel can be contacted by the Response Coordinator, as at 122.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. A method comprising:
    establishing a plurality of personal response profiles in a database with each personal response profile associated with a possible personal emergency of a person and with each personal response profile including information related to an optimal desired response for that person to a safety or health issue;
    sensing an emergency indicating signal initiated by that person through a mobile device carried by the person;
    a processor of a response coordinating unit receiving a personal response profile for that person including location information of the mobile device, the received personal response profile including information related to an optimal desired response for that person, and responsive thereto, the processor retrieving that person's personal response profile from the plurality of personal response profiles in the database;
    the processor comparing at least some of the information related to the optimal desired response in that person's retrieved personal response profile to the information related to the optimal desired response in that person's received personal response profile in order to discern a service that the person is entitled to receive; and
    responsive to the comparison of the personal response profiles, the processor transmitting an emergency indicating signal activating a nearby public safety or health device based upon the location information of the person, the activated nearby public safety or health device emits a visual alarm in the vicinity of the person.

2. A method as in claim 1 which includes, establishing at least one of a plurality of treatment devices, or, a plurality of communications devices and upon one of the devices receiving the emergency indicating signal, responsive thereto, emitting at least a visual alarm in the vicinity of the person.

3. A method as in claim 2 which includes emitting an audible alarm.

4. A method as in claim 3 where emitting an audible alarm includes emitting verbal instructions.

5. A method as in claim 2 which includes establishing a plurality of automatic emergency defibrillators as the treatment device and a telephone as the communications device.

6. A method as in claim 1 which includes establishing an originating location of the sensed signal.

7. A method as in claim 6 which includes establishing at least one emergency assistive device proximate to the location and transmitting an emergency signal to activate the device.

8. A method as in claim 7 where activating the device includes emitting at least one of a visual, or an audible emergency indicator.

9. A system comprising:
    a plurality of emergency response devices where each member of the plurality has a communications port;
    a locating system that identifies the location of members of the plurality of emergency response devices;
    a database that contains a plurality of personal response profiles, where each personal response profile is associated with a possible personal emergency of a person and where each personal response profile includes information related to an optimal desired response for that person to a safety or health issue;
    a port emergency signal generator that can emit an emergency indicating signal and transmit a pre-stored personal response profile and location information, where the pre-stored personal response profile includes information related to an optimal desired response for a person associated with the port emergency signal generator; and
    a processor of a response coordinating unit that processes the transmitted pre-stored personal information profile and location information,
    wherein, in response to the emitted emergency indicating signal and the transmitted prestored personal response profile, the processor compares the pre-stored personal information profile with a content of the database and when the information related to the optimal desired response in the pre-stored personal response profile matches the information related to the optimal desired response in a personal response profile in the plurality of personal response profiles in the database, then at least one of the emergency response devices is activated by the processor based upon the location information.

10. A system as in claim 9 where at least one device is activated which is within a predetermined distance from the location of the signal generator.

11. A system as in claim 9 wherein the emergency response device includes a receiver to respond to a received emergency indicating signal.

12. A system as in claim 11 where the emergency response devices are selected from a class which includes at least, automatic emergency defibrillators, or, telephone-like communications devices.

13. A method comprising:
    establishing at least one personal response profile in a database, the personal response profile including information related to an optimal desired response to a personal emergency for an associated person to a safety or health issue;

associating the personal response profile with a wireless communications device;

receiving an emergency indicating signal through the wireless communication device;

a processor of a response coordinator unit receiving a personal response profile including location information of the wireless communication device, the received personal response profile including information related to an optimal desired response for an associated person;

comparing at least some of the information related to the optimal desired response in the received personal response profile with the information related to the optimal desired response in the personal response profile in the database in order to discern a service that the associated person is entitled to receive; and responsive to the comparison of the personal response profiles and location information, locating at least one responsive device consistent with the information in the personal response profiles and activating that device to emit locating indicia.

14. A method as in claim 13 which includes emitting at least one of audible or visual locating indicia.

15. A method as in-claim 14 which includes transmitting the emergency indicating signal from the communications device.

16. A method as in claim 13 which includes using the communications device to establish the person specific profile in the database.

17. A method as in claim 16 where the responsive device is selected from a class which includes at least automatic emergency defibrillators, and telephone-type communications devices.

* * * * *